United States Patent
Rosek

Patent Number: 5,327,671
Date of Patent: Jul. 12, 1994

[54] VERTICAL RETRIEVE FISHING LURE

[76] Inventor: William A. Rosek, Rte. 4, Box 244, Waverly, Va. 23890

[21] Appl. No.: 153,032

[22] Filed: Nov. 17, 1993

[51] Int. Cl.⁵ ............................................. A01K 85/00
[52] U.S. Cl. .................... 43/42.17; 43/42.19; 43/42.14
[58] Field of Search ............... 43/42.14, 42.17, 42.19, 43/42.16, 42.2

[56] References Cited

U.S. PATENT DOCUMENTS

| | | | |
|---|---|---|---|
| 613,519 | 11/1898 | Junod | 43/42.19 |
| 706,941 | 8/1902 | Hildebrandt | 43/42.14 |
| 2,214,668 | 9/1940 | Erickson | 43/42.17 |
| 2,323,096 | 6/1943 | McDowell | 43/42.17 |
| 2,926,451 | 1/1960 | Leba | 43/42.17 |
| 3,555,717 | 1/1971 | Gautsche, Jr. | 43/42.17 |
| 3,775,892 | 12/1973 | Bennetts | 43/42.14 |
| 4,110,930 | 9/1978 | Daniels | 43/42.14 |
| 5,076,005 | 12/1991 | Rosek | 43/42.14 |
| 5,201,859 | 4/1993 | Rosek | 43/42.19 |

*Primary Examiner*—Kurt C. Rowan
*Attorney, Agent, or Firm*—Norman B. Rainer

[57] ABSTRACT

A fishing lure is provided which functions effectively in both horizontal and vertical directions of movement through water. The lure is built upon a stiff wire support, and has a buoyant member, spinner unit, weight member and lower attractor member disposed in sequence from top to bottom, respectively, upon the wire support. The relative effectiveness of the buoyant member is selected in association with the weight member and other components such that the lure, when falling through water, assumes a vertical attitude.

9 Claims, 1 Drawing Sheet

VERTICAL RETRIEVE FISHING LURE

BACKGROUND OF THE INVENTION

1. Field of the Invention

The present invention concerns fishing lures, and more particularly relates to a fishing lure which functions effectively in both horizontal and vertical directions of movement.

2. Description of the Prior Art

Fishing lures which function effectively in all directions of motion are disclosed in U.S. Pat. Nos. 5,076,005 and 5,201,859 issued to this inventor. Such lures are comprised of an elongated stiff wire shaft upon which is mounted a spinner device, a weight member, an attractor member, and fish hooks. When the lure moves through the water, the spinner device rotates. In vertical modes of motion, as when the lure is being retrieved vertically upward, or allowed to fall, the dynamics of the spinner are intended to stabilize the attitude of the lure so that it maintains a vertically aligned orientation. Without the spinner, the lure would tip ineffectually on its side upon falling.

Examples of situations when vertical stabilization of the lure would be desirable include, but are not limited to, ice fishing, jigging over brush piles and along drop-offs and ledges, as well as during the count-down method of fishing; wherein, the cast lure is allowed to sink for a predetermined period of time to reach a certain depth before the lure is retrieved in the normal manner along a generally horizontal plane.

Although the lures described in the aforesaid patents are generally effective, greater positional stabilization of the lure in vertical orientation is needed, especially when falling through the water. Greater versatility is also sought with respect to attractor members that may be associated with the lure.

It is accordingly an object of the present invention to provide a fishing lure which functions effectively in all directions of movement through the water.

It is another object of this invention to provide a fishing lure as in the foregoing objective which will have a controlled speed of descent and will minimize line twisting.

It is a further object of the present invention to provide a lure adapted to accommodate different attractor members.

It is a still further object of this invention to provide a lure of the aforesaid nature of durable construction and amenable to low cost manufacture.

These and other beneficial objects and advantages are accomplished in accordance with the present invention by a fishing lure comprising:

a) an elongated stiff wire support having an upper extremity provided with an eyelet and a lower extremity provided with a looped snap member, b) a spinner unit having 1 to 8 upwardly directed blades radially disposed around a hub element journaled to said wire support, c) a pair of spherical bearing units having central bores and rotatively mounted on said wire support above and below said spinner unit, d) an elongated keel-shaped weight member securely affixed to said wire support below the lower one of said spherical bearing members, e) a buoyant head having a centered channel and mounted on said wire support above the higher of said spherical bearing members, f) a removable upper attractor member configured to embrace said weight member, and g) a lower attractor and fish hook unit removably held by said looped snap member.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figures 1, 2, 3:
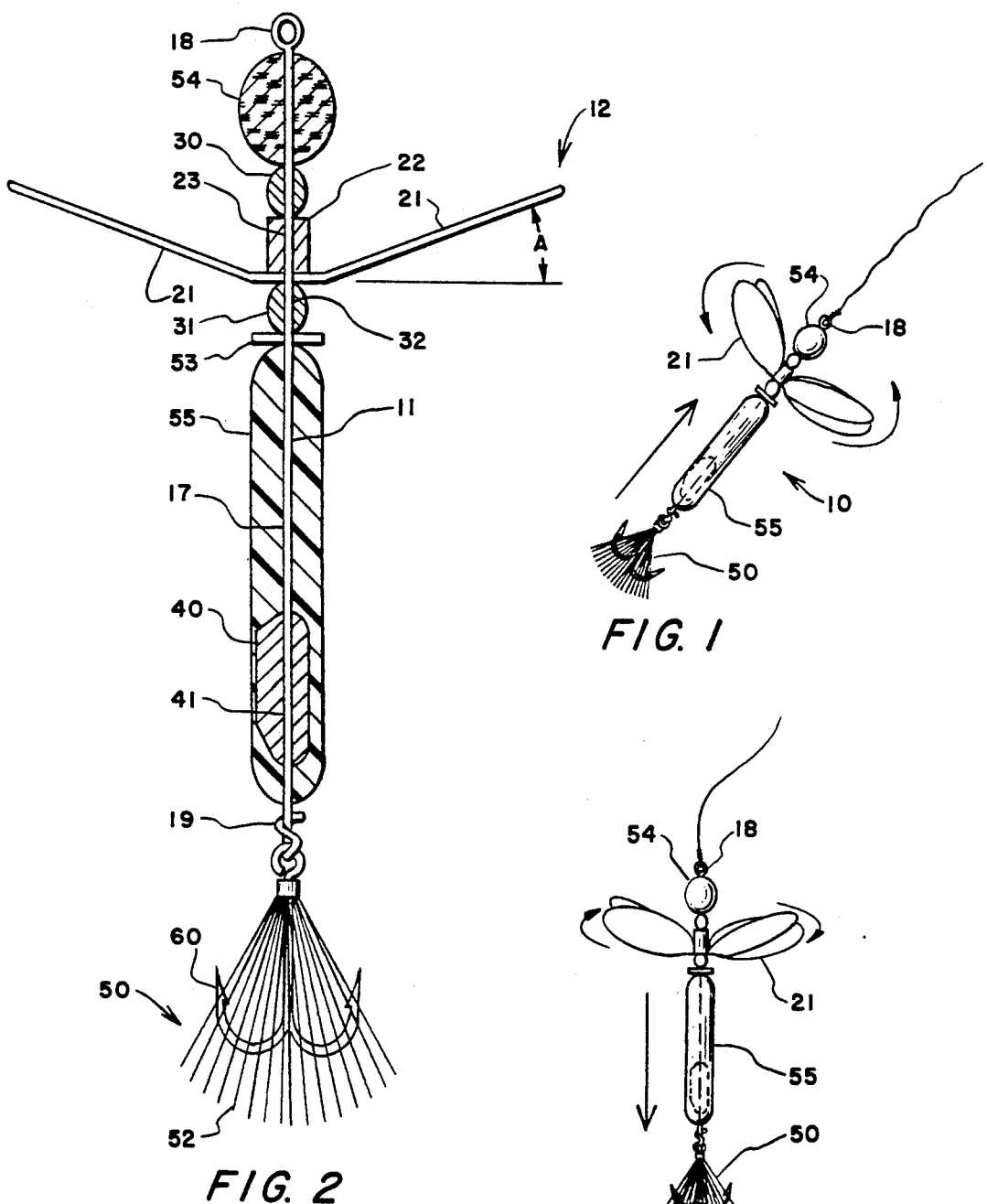
FIG. 1 is a perspective view of an embodiment of the lure of the present invention shown as it would appear when pulled through the water.
FIG. 2 is a sectional side view of the embodiment of FIG. 1.
FIG. 3 is a perspective view of the lure of FIG. 1 shown as it would appear when falling through the water.

Referring to FIGS. 1-3, an embodiment of the lure 10 of the present invention is shown built upon an elongated stiff wire support 11 comprised of a shaft portion 17 having an eyelet member 18 formed at its upper end and a looped snap member 19 formed on its lower end. Said snap member is formed only after the other structural components of the lure have been threaded onto said shaft portion.

A spinner unit 12 having one to eight upwardly directed blades 21 radially disposed about a hub element 22 is journaled to said shaft portion by virtue of a centered bearing bore 23 in said hub. The expressions "upwardly" or "forwardly" as employed herein are intended to denote the direction facing eyelet member 18. When a number of blades are employed, they are of identical size and shape, and are equidistantly spaced in a circular array about the hub. The extent by which the blades are forwardly directed is indicated by the angle A of FIG. 2, which may range between 10 and 20 degrees.

In preferred embodiments, the blades are concavely curved in the upward direction, and are pitched relative to the hub in a manner of a propeller of an airplane. Bore 23 is of cylindrical contour, having a length preferably at least four times its diameter, and a diameter about 0.004 to 0.020 inch greater than the diameter of shaft portion 17. Such characteristics of the bore cause the spinner unit to rotate freely and easily upon said shaft portion, yet without wobble. It is to be noted that, when the lure is allowed to fall through the water, as shown in FIG. 3, the direction of rotation of the spinner is opposite to the direction of rotation when the line is pulled through the water, as shown in FIG. 1.

Upper and lower spherical bearing units 30 and 31, respectively, having centered bores 32 are rotatively disposed upon said shaft portion above and below hub element 22. A stop unit 53 is affixed to shaft portion 17 below lower bearing unit 31 for the purpose of maintaining the position of forwardly disposed components on said shaft portion.

An offset, keel shaped, elongated weight member 40 having rounded extremities and an elongated axial channel 41 is mounted by virtue of said channel and affixed securely to said shaft portion below stop unit 53. It has been found that, by affixing the weight member to the wire shaft, and by employing an offset, keel shaped weight unit, twisting of the fishing line to which the lure is attached is significantly reduced or eliminated. The weight member can be fixed to the wire via crimping, solder, adhesives, or other means. The expression "offset" is intended to denote a configuration asymmetric relative to shaft portion 17. In particular, the keel structure is disposed on just one side of shaft 17.

A buoyant head 54 having a centered channel is rotatively mounted by virtue of said channel upon shaft portion 17 in abutment with upper bearing unit 30 and eyelet member 18. The size, shape and degree of buoyancy of buoyant head 54 are carefully chosen so that the combined effect of the weight member, spinner unit, and buoyant head is such as to dispose the lure in a stable vertical position when falling through the water. It has been found that, in the absence of buoyant head 54, the lure may descend in water in an orientation other than vertical with eyelet 18 upwardly directed. Such is particularly the case when a lower attractor is employed comprised of feathers which create a drag force comparable to the gravitational effect of the weight element.

A removable upper attractor member 55, preferably fabricated of soft plastic material, is adapted to removably embrace said weight member. Member 55 may be partially slit in a manner permitting adequate deformation for emplacement upon the weight member and wire shaft. Once emplaced, attractor member 55 may be secured in place by clips, tape, wire, or other equivalent securing means. Attractor member 55 may be of a shape, size and color as to resemble favorite food items of the fish being sought. Numerous different attractor members may be alternatively employed on the same lure.

A conventional multi-pointed fish hook 60 is held by looped snap member 19. In order to achieve its function of concealing the fish hook without impairing its effectiveness, a lower attractor member 50 is preferably comprised of a fringed skirt element 52 or equivalent multi-stranded structure which may be fabricated of fibers, feathers, plastic tentacles and the like, and tied directly to the top of the hook.

When employed in lures of the aforesaid construction, the buoyant head provides two significant effects, namely: a) enhanced attainment of vertical posture, even without a spinner, particularly when a weight member is disposed upon the lower portion of the wire support and b) slowed rate of descent, the magnitude of which is controllable by suitable matching of the size of the buoyant head to the size of the weight. Such effects improve the efficiency of the lure in catching fish.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A vertical retrieve fishing lure comprising:
   a) an elongated stiff wire support having an upper extremity provided with an eyelet and a lower extremity provided with a looped snap member,
   b) a spinner unit having 1 to 8 upwardly directed blades radially disposed around a hub element journaled to said wire support,
   c) upper and lower bearing members having central bores and rotatively mounted by virtue of said bores on said wire support above and below said spinner unit, respectively,
   d) an offset keel shaped elongated weight member affixed securely to said wire support below said lower bearing member,
   e) a buoyant head having a centered channel and mounted by virtue of said channel on said wire support above said upper bearing member,
   f) a removable upper attractor member configured to embrace said weight member, and
   g) a removable lower attractor member and fish hook unit removably held by said looped snap member.

2. The fishing lure of claim 1 wherein said hub element has a centered bearing bore of cylindrical contour having a length at least four times greater than its diameter.

3. The fishing lure of claim 2 wherein the diameter of the bore of said hub is between 0.004 and 0.020 inch greater than the diameter of said wire support.

4. The fishing lure of claim 1 wherein said upper attractor member is fabricated of soft plastic material.

5. The fishing lure of claim 1 wherein the size, shape and degree of buoyancy of said buoyant head are chosen so that the combined effect of the weight member, spinner unit, and buoyant head is such as to dispose the lure in a stable vertical position when falling through water.

6. The fishing lure of claim 5 wherein said bearing members are of spherical contour.

7. The fishing lure of claim 6 further comprising a stop unit engaged by said wire between said lower bearing member and weight member.

8. The fishing lure of claim 7 wherein said weight member has rounded extremities.

9. The fishing lure of claim 1 wherein said blades are concavely curved in the upward direction.

* * * * *